April 19, 1927.  1,625,298
J. COPILOVICH
GAS STOVE
Filed Oct. 15, 1926   2 Sheets-Sheet 1
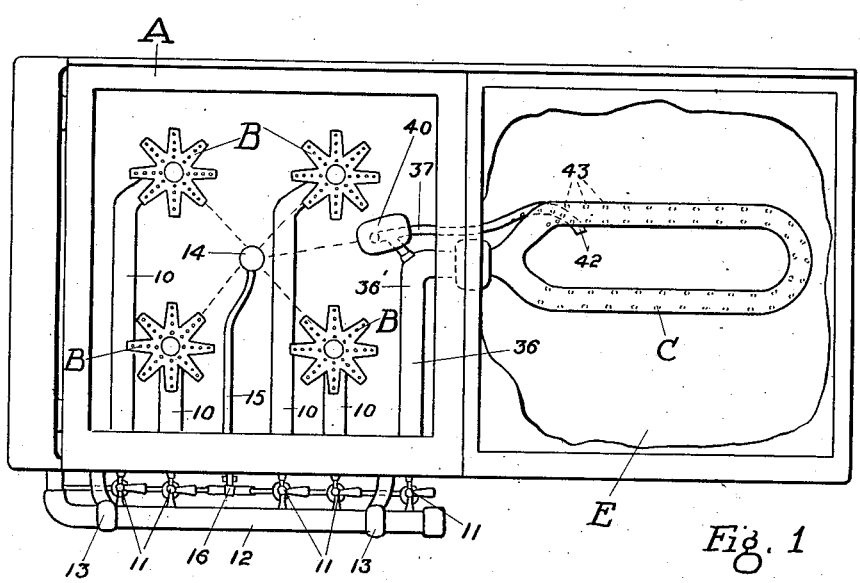
Fig. 1
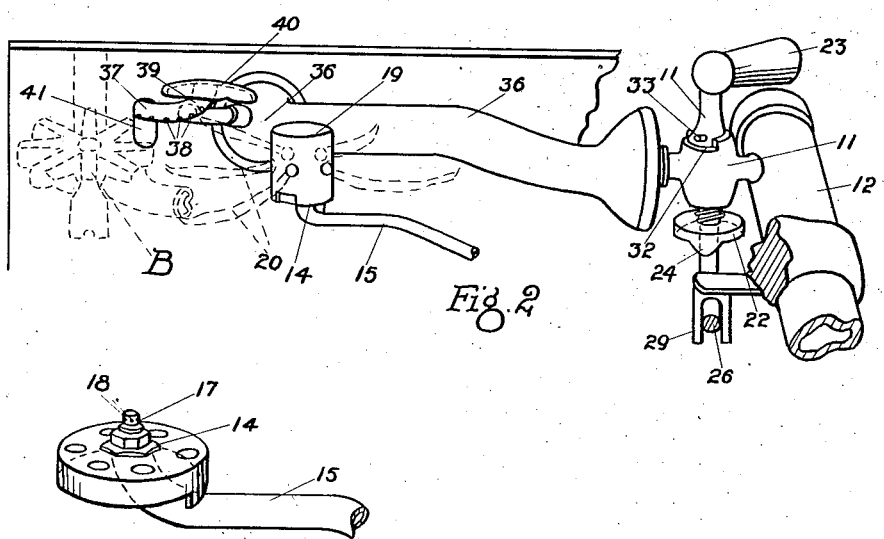
Fig. 2
Fig. 3
Inventor
Jacob Copilovich
By Howard Fuchs
Attorney April 19, 1927.  J. COPILOVICH  1,625,298
GAS STOVE
Filed Oct. 15, 1926  2 Sheets-Sheet 2
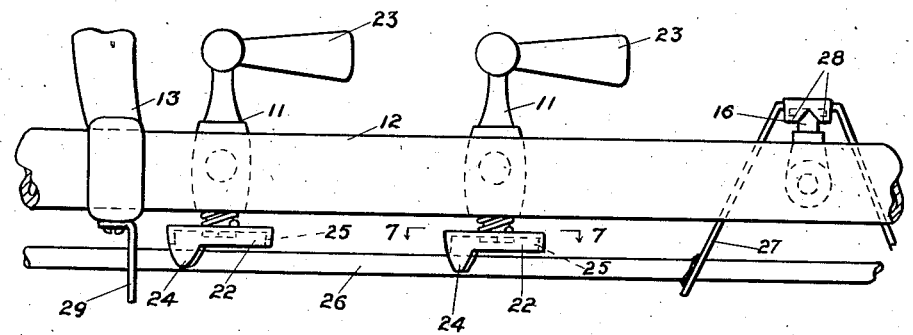
Fig. 4
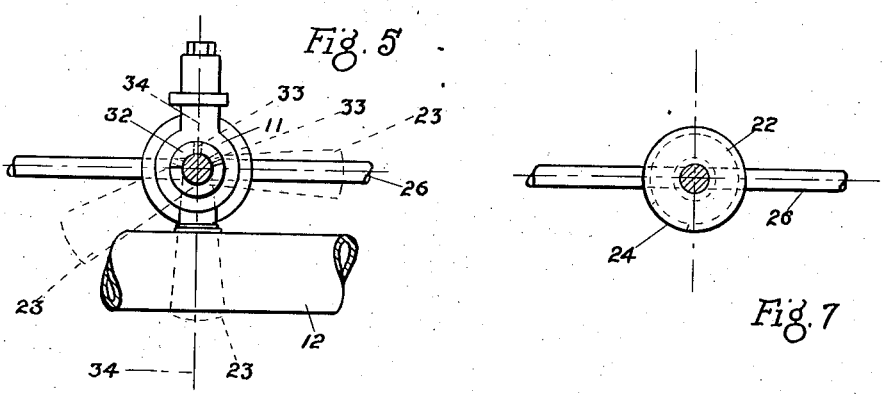
Fig. 5
Fig. 7
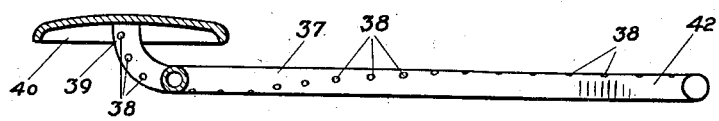
Fig. 6
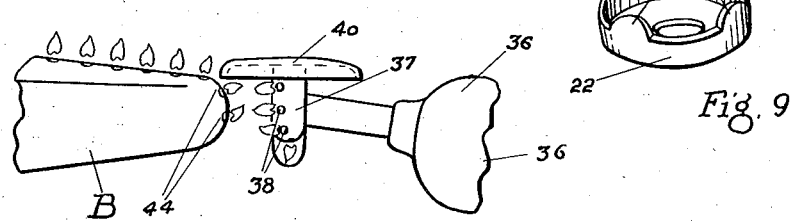
Fig. 8
Fig. 9
Inventor
Jacob Copilovich
By Howard Fiscle
Attorney Patented Apr. 19, 1927.

1,625,298

UNITED STATES PATENT OFFICE.

JACOB COPILOVICH, OF ST. PAUL, MINNESOTA.

GAS STOVE.

Application filed October 15, 1926. Serial No. 141,729.

My invention relates to an improvement in gas stoves wherein it is designed to provide a safety construction for the gas stove so that it is practically impossible to turn on any of the burners of the gas stove without lighting the burner turned on.

A feature of my invention resides in means for selectively and automatically lighting any particular burner by turning it on, the act of turning on the burner automatically lighting the same.

A feature of my invention resides in means for automatically lighting the oven burner of a gas stove by simply turning on the valve which controls the flow of gas to the oven and which automatically operates lighting means to light the gas of the oven burner by the act of turning on the gas to the same. This is an important feature of my invention as it provides a gas stove having the advantage of overcoming the undesirable feature of making it necessary to light the burner of the oven with a match or other lighting means. In so far as I know, this is an entirely novel and new idea which is adapted to overcome the detrimental features of lighting a gas oven, which cause more or less of a small explosion when being lighted, due to the volume of gas which is necessary to be directed to the oven burner and the gas channel which is ordinarily used associated with gas oven burners. My invention obviates the necessity of the gas channel for gas oven burners so that they can be lighted through the channel and provides a simple yet very effective means of automatically lighting the burner of the oven without opening the oven and without the usual puff which so commonly occurs in the ignition of surplus gas when the oven burner is lit.

My invention also includes the feature of supplying the gas for the lighting of the oven burner from the oven burner valve and gas arm or tube which leads to the burner proper. In other words, I do not need a separate supply of gas for lighting the oven burner, but by means of a feeder tube extending from the gas arm leading from the valve to the burner, I supply gas to the feeder tube which is adapted to be automatically ignited in the act of turning the gas to the oven burner which directs a light to the oven burner which is prior to the gas reaching the outlets of the burner, so that as soon as the gas begins to escape from the oven burner outlets it is ignited by the feeder tube, thereby overcoming the filling of the oven with surplus gas before it is ignited. While heretofore it has been quite objectionable to ladies to light the oven burner of a gas stove owing to the fact that the burner would puff when it was lit due to the escape of excess of gas before the burner ignites, my lighter entirely overcomes this, making it a pleasure to operate my gas stove in the lighting of any of the burners which is selected as the burner desired.

It is also a feature of my invention to provide means for igniting the gas burner automatically from one of the surface burners so that if it is desired to light the gas burner for the oven and the surface burner is in operation, that is, lit, it is only necessary to turn on the gas valve for the oven burner, thereby automatically igniting the gas oven burner through the surface burner. In this manner I provide means for lighting the gas oven burner from a surface burner, a feature which I believe is entirely new in so far as I know.

It is a feature of my invention to provide means for operating a pilot light on my gas stove automatically to direct the flame in a manner so that any burner may be ignited and thereby selectively lighting the burners of the gas stove, and with this means of operating the pilot light I provide a cam operating member which is associated with the valve of the gas burners to automatically operate the pilot in the turning on of the burner. I include in my invention means for permitting the burner to be turned down by turning the burner valve beyond the wide open position, thereby shutting off the valve to a pre-determined amount so that the burner can be readily turned down without going out and without operating the pilot lighter. The pilot lighter is only turned on in the opening of the gas valve and in the complete closing of the same.

A feature of the invention resides in providing means for automatically operating the pilot light to direct a light or flame to the respective burner to be lit in advance of the directing of the gas to any particular burner. In this manner there is no chance of escape of gas from the burner without being ignited by the automatic lighting means.

These features, together with other details and peculiar arrangement of parts of my gas stove and other objects will be more clearly and fully set forth in the following specification and claims.

In the drawings forming part of this specification:

Figure 1 is a plan view of my gas stove, a portion of the oven being broken away to indicate the oven burner within the stove.

Figure 2 is a perspective view of the gas arm leading to the oven burner, a portion of the pilot and the automatic operating means associated with the burner valve.

Figure 3 is a perspective detail of a portion of the pilot lighter.

Figure 4 is a detail of a portion in elevation of the gas pipe valves and the operating cams and lever or rod member for operating the pilot.

Figure 5 is a plan detail partly in section of one of the burners showing the different positions of the valve handle.

Figure 6 is a detail in section of the over burner gas feeder lighter with its covering and protecting hood.

Figure 7 is a section on the line 7—7 of Figure 4 in the direction of the arrows, showing the position of the cam.

Figure 8 is a detail of an alternative means showing a portion of a burner, and a portion of the oven gas feeder arm or tube, showing the gas feeder lighter for the oven with its hood in operative position and showing the arm of the burner proper igniting the oven lighter feeder tube to light the oven burner.

Figure 9 is a perspective view of an alternative form of the operating cam for the valves of my gas stove.

My gas stove A is adapted to include the surface burners B which are provided with the ordinary and well known gas arms 10 extending from the gas valves 11. The gas valves 11 are connected to the main gas feeder pipe 12 which extends along the front of the gas stove A in the ordinary and well known manner and which is supported by suitable brackets 13 to the front of the stove A.

A primary feature of my invention is to provide a gas stove wherein any of the burners may be lit automatically by simply turning on the gas valves 11. My gas stove A is provided with a pilot lighter 14 which is connected by the pipe 15 to the operating valve 16, while the valve 16 is connected to the main gas feed pipe 12.

The lighter 14 is provided with a burner 17 which is formed with gas openings 18 in a manner to maintain a small pilot light beneath the hood 19 of the lighter 14 and when the valve 16 is operated the lighter 14 is adapted to project flames such as 20 to the respective burners B.

Each of the valves 11 of my gas stove A is provided with cam discs 22 which are secured to the bottom of the valve 11 in a manner so that when the valve 11 is operated by the handle 23, the cam disc is rotated. The cam disc or member 22 is provided with a cam portion 24 which projects from the annular flange 25. The cam 22 is adjustably supported at the lower end of the valve 11 and is adapted to be positioned so that the valve may turn the cam 24 into operating position just before the valve 11 opens sufficiently to direct a flow of gas to the burner B.

Directly below the cam members or discs 22 I provide an operating rod 26 which extends along below the respective valves 11 and which is supported by means of the yoke 27. The yoke 27 extends up over the top of the pilot valve 16 and is secured thereto by the ears 28 which are adapted to be bent to engage beneath the operating button of the valve 16. This secures the yoke 27 firmly to the valve 16 and supports the rod 26 in a manner to be floatingly held directly below the cam discs 22. By means of a pair of slotted arms 29 which are secured to the brackets 13 the rod 26 is held on its ends against movement out of line with the cam members 22, and thus when any of the handles 23 are operated the cams 24 are adapted to operate the rod 26 to depress the same and thereby operate the valve 16, automatically directing the flame 20 to the burners B selectively so that they may be lit automatically in turning on the gas. The valve cam members 22 are adapted to be so adjusted on the valves 11 that the cam 24 may be rotated in a manner to operate the rod 26 so that the pilot light 14 is operated to project the flame to the burner just before the gas is directed to the same. Thus no gas can escape before the flame 20 is projected to the respective burner and when the gas does come out of the burner the flame is there to light it immediately. In this manner practically no escape of gas is apparent in my gas stove.

I have illustrated in Figure 9 a cam disc 22 which is provided with a series of cams 24 or ears, which may be used in place of the single cam member 24 illustrated on the discs 22 which are connected to the valves 11. It is to be preferred, however, to use a single cam 24 as illustrated in the figures under ordinary conditions.

A feature of my invention resides in permitting the turning of any of the burners down low without operating the automatic lighter means including the pilot lighter 14. I accomplish this by forming the valve 11 with the groove 32 extended beyond the quarter or 90° movement which is ordinarily the construction of the regular gas stoves now in use in so far as I know. This permits the pin 33 which acts as a stop on the valve 11 to travel in the groove 32 beyond the center line 34, illustrated in Figure 5, which is the wide open position of the valve 11, and permits the pin 33 to be turned over to the position illustrated in dotted outline in Figure 5 with the handle 23 beyond the center line 34 and moved in the opposite direction to the closing of the burner ordinarily when it is desired to shut the burner off. By this means I may turn down any of the burners without operating the lighter 14 and it also permits me to provide a construction of gas stove wherein the housewife may readily turn down the burner without danger of watching closely to see that she does not turn it down too far so that it will go out. The groove 32 is so constructed as to extend only far enough to permit the turning down of the burner to a point where it will still remain lighted, and not to a point of 90° so as to shut off the valve 11. I have found this a very desirable feature in my gas stove.

My invention also includes a gas stove wherein the oven burner C is adapted to be automatically lit by turning on the oven burner valve 11 which directs gas to the gas arm 36 in a manner to feed gas to the burner C.

I have illustrated in the drawings the oven E cut away so as to clearly show the burners C within the same.

The gas arm 36 is provided with a gas lighter feeder pipe 37 which projects from the elbow portion 36' of the arm 36 in a manner so that when gas is turned into the gas arm 36 it will extend into the gas lighter feeder 37. The gas lighter feeder 37 is formed with a series of small holes 38 extending from the upturned end 39 which is covered by the protecting hood 40 which protects the feeder 37 from anything falling onto the same which might ordinarily clog the openings 38. The feeder lighter 37 extends from the arm 36 through an elongated opening 41 leading into the oven E with the inner end 42 of the light 37 extending close to the openings 43 of the burner C. It will be noted from Figure 6 that the lighter feeder 37 is formed in a manner so as to extend upwardly at 39 to support the hood 40 and the small openings 38 extend up the side of the upturned end 39 and then along toward the end 42 of the feeder 37, but in a spiral-like direction so as to bring the openings 38 out on approximately the top of the end 42 to more readily direct a flame to the burner C.

The hood 40 also inclines to hold the gas about the upturned end 39 of the feeder 37 so that when the valve 11 is operated and a flame is directed from the lighter 14 to the light 37 and beneath the hood 40, as soon as the gas is fed from the gas arm 36 to the feeder 37 it will be ignited and will creep along the opening 38 to the end 42, automatically and practically immediately lighting the gas as it escapes from the openings 43 of the burner C. Thus the burner C is lit automatically by the operation of the valve 11 without any puff or small explosion which is ordinarily the case in lighting gas oven burners and which is quite objectionable to the housewife. The ordinary lighting of the gas oven burners is even dreaded by some housewives as it often makes a small explosion as a large amount of gas is lighted. With my invention this is entirely overcome.

The opening 41 projects below the pipe or feeder 37 in a manner to permit the flame to crawl through the partition of the gas oven and thus the flame from the lighter 14 is adapted to extend to the feeder 37 which quickly and in fact, practically instantaneously lights the oven burner C with the turning on of the valve 11. It can be readily appreciated the importance of this lighting of the oven together with the lighting of the burners selectively and thereby providing a gas stove which is adapted to fill a long felt want.

The oven burner C may be lighted by the lighter 37 picking up a light from one of the burners B which is formed with a series of openings 44 extending over the end of the same as illustrated in Figure 8 and in a manner to project a flame beneath the hood 40 which is adjacent to one of the burners. The hood and light may extend in close proximity to one of the burners B as illustrated in Figure 8 and thus the flame from the opening 44 is adapted to automatically light the feeder 37 when the valve 11 for the oven burner C is turned on and thereby automatically light the oven burner without the necessity of the lighter or pilot such as 14.

My feeder 37 may be used as a simmer, that is, the end 39 with the hood 40, as some heat will be directed up from the same at the same time that the oven burner C is in operation. This provides a feature to the invention eliminating the necessity of a separate valve for the simmer as is sometimes the case with some constructions of gas stoves.

The operation of my gas stove A is very simple and of a practical nature as it provides a safety gas stove wherein it is practically impossible for children to turn on the valves 11 without lighting the burners B or the burners C and thereby providing a safety gas stove for the home which is to be greatly preferred over the construction of stove where the burners are not lit in this manner. Further, my gas stove provides an automatic means for lighting the burners by merely turning on the gas valve to the burner, thereby providing a lighting means which can be operated by one hand and permitting a person to hold a kettle or other utensil in the other hand. This is not true with the ordinary lighting means for gas stoves in so far as I know.

In accordance with the patent statutes I have described the principles of operation of my gas stove and while I have illustrated a particular formation and construction in the drawings adapted to be associated with the burners and of a particular construction of burner valves and burners, I desire to have it understood that the same is only illustrative and that my invention may be carried out by other means and applied to uses other than those above set forth without departing from the spirit of my invention.

I claim:

1. An automatic oven burner lighter for a gas stove comprising a burner within an oven, a valve for said burner, a gas pipe connecting said burner and valve, a flashing pilot light outside said oven automatically flashed upon the opening of said valve, a hood outside said oven and spaced from said pilot light and a lighter tube connected to said gas pipe and leading from below said hood to said burner for automatically lighting said burner upon the opening of said valve.

2. An oven burner lighter comprising a burner within an oven, a valve for said burner, a gas pipe connecting said burner and said valve, a perforated lighter tube connected to said gas pipe outside said oven and leading to said burner, a hood disposed above a perforated portion of said lighter tube outside said oven and means for automatically igniting the gas in said lighter tube and thereby leading the flame to said burner upon the opening of said valve.

3. An oven burner lighter comprising a burner within an oven, a valve for said burner, a gas pipe connecting said burner and said valve, a lighter tube connected to said gas pipe outside said oven and leading to said burner, spirally arranged apertures in said tube leading the flame from the exterior of said oven to the interior, said flame being directed downwardly upon the exterior of the oven and upwardly in the interior thereof, a hood disposed above a perforated portion of said lighter tube outside said oven, a flashing pilot light spaced from said hood and lighter tube and means whereby upon the opening of said valve a flame will be flashed from said pilot light to said lighter tube whereby the burner of the oven will be lighted automatically.

JACOB COPILOVICH.